United States Patent [19]

Otte et al.

[11] Patent Number: 4,657,731

[45] Date of Patent: Apr. 14, 1987

[54] METHOD FOR REMOVING CESIUM FROM AN AQUEOUS LIQUID AND PURIFYING THE REACTOR COOLANT IN BOILING WATER AND PRESSURIZED WATER REACTORS

[75] Inventors: Joseph A. N. Otte, Ruisbroek; Dennis Liebman, Sinzheim, both of Fed. Rep. of Germany

[73] Assignee: The Dow Chemical Company, Midland, Mich.

[21] Appl. No.: 579,623

[22] Filed: Feb. 13, 1984

[30] Foreign Application Priority Data

Feb. 11, 1983 [EP] European Pat. Off. ....... 83-200224.2

[51] Int. Cl.$^4$ ............................................. G21C 19/42
[52] U.S. Cl. .................................... 376/313; 252/631; 423/2; 423/181
[58] Field of Search ............... 423/2, 7, 181; 376/313; 252/631

[56] References Cited

U.S. PATENT DOCUMENTS

| | | | |
|---|---|---|---|
| 3,554,709 | 1/1971 | Orlandini et al. | 423/2 |
| 3,953,568 | 4/1976 | Seko et al. | 423/7 |
| 4,107,044 | 8/1978 | Levendusky | 252/631 |
| 4,110,204 | 8/1978 | Farmer | 423/7 |
| 4,256,702 | 3/1981 | Lyandet et al. | 423/7 |
| 4,401,591 | 8/1983 | Korostenski | 423/7 |
| 4,434,138 | 2/1984 | Lee et al. | 423/7 |

*Primary Examiner*—Edward A. Miller

[57] ABSTRACT

Water containing cesium, such as the reactor coolant of a pressurized water nuclear reactor, is purified by passing the water through an ion exchange resin bed containing a highly cross-linked, macroporous, strong acid resin derived from a monovinylidene aromatic and a cross-linking monomer compolymerizable therewith. The cross-linking monomer is employed in amounts of at least 12 mole percent based on the total weight of the monovinylidene aromatic and cross-linking monomer.

7 Claims, 1 Drawing Figure

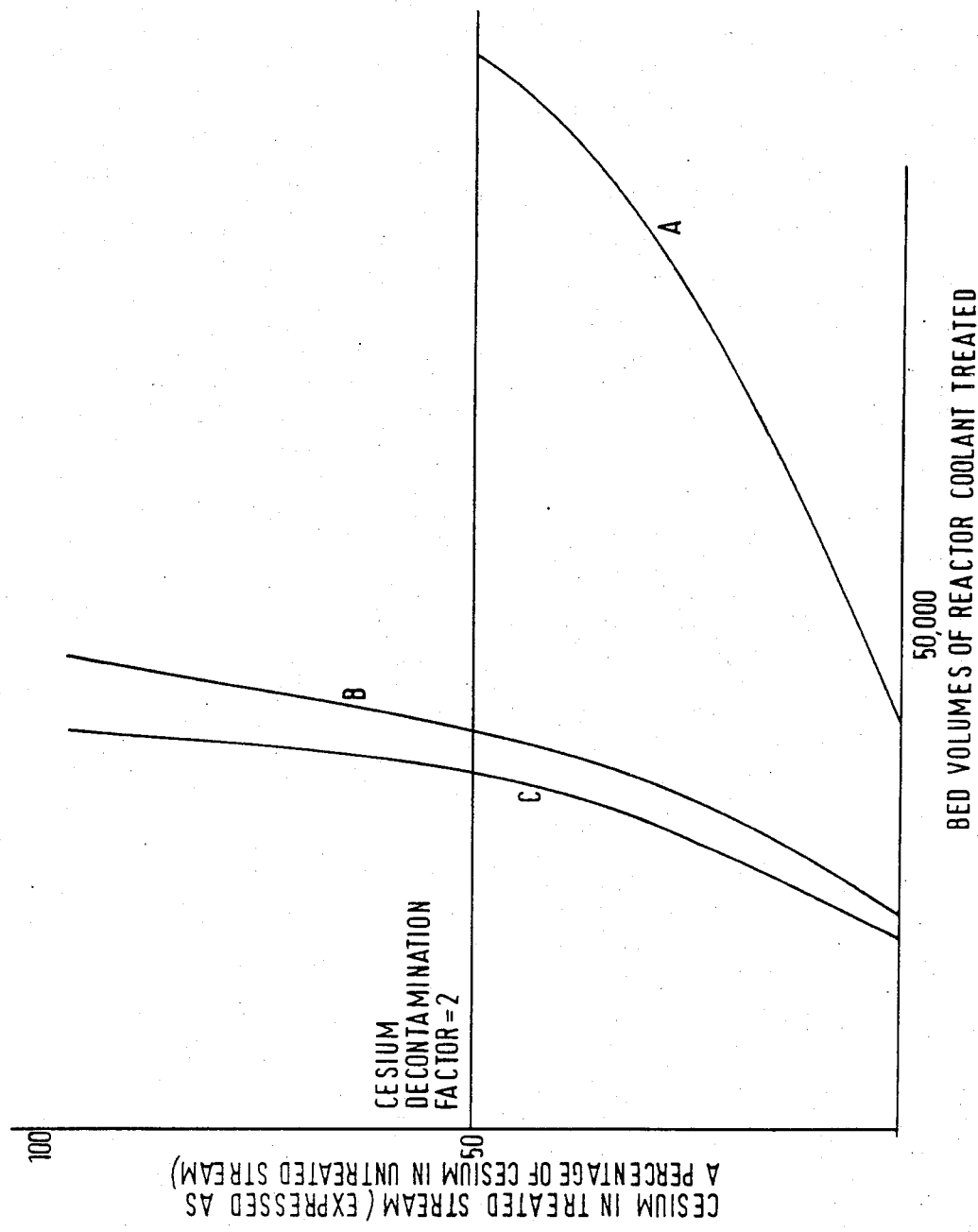

METHOD FOR REMOVING CESIUM FROM AN AQUEOUS LIQUID AND PURIFYING THE REACTOR COOLANT IN BOILING WATER AND PRESSURIZED WATER REACTORS

The present invention relates to a method for removing cesium from an aqueous liquid, a method for purifying the reactor coolant used in a boiling water nuclear reactor or in the primary circuit of a pressurized water nuclear reactor and to a resin bed containing a mixture of an anion exchange resin and cation exchange resin useful in said purification.

In the operation of a pressurized water reactor for the production of power, large amounts of water (commonly referred to as a "reactor coolant") are circulated through a loop (conventionally referred to as the "primary loop" or "circuit") containing the reactor and a heat-exchanger boiler or steam generator. The reactor coolant transfers heat gained from the reactor core to the heat-exchanger boiler where the high temperature, reactor coolant which conventionally flows through the tubes of the boiler generates steam from feed water flowing through the shell side of the boiler. Conventionally, the generated steam is fed to a turbine generator for the production of electrical power. Throughout its circulation through the primary circuit, the reactor coolant is maintained at a sufficiently high pressure to prevent boiling, i.e., the reactor coolant is maintained as a liquid.

In the described operation of a pressurized water reactor, the reactor coolant, or at least a portion thereof, is continuously purified to remove or reduce the radioactive isotopes and other impurities contained therein. In general, to remove the undesirable ionic components from the reactor coolant, the coolant is contacted with both an anion and cation exchange resin. Although the reactor coolant can sequentually be contacted with the one resin type and thereafter with the other resin type, the liquid is more conventionally contacted with a resin bed containing both the anion and cation exchange resins, i.e., a mixed resin bed.

The cation exchange resin of the mixed resin bed remove the cationic impurities, including the various cationic radioactive isotopes, from the reactor coolant. Representative of such radioactive isotopes include the isotopes of cesium, iodine, strontium, antimony, lithium-7, (formed by neutron activation of boron, which is added to control excessive neutrons), and radioactive corrosion products such as the isotopes of cobalt, manganese, chromium and iron. The capacity of the cation exchange resin to remove cesium from the reactor coolant is particularly important due to the high concentration of radioactive cesium isotopes in the coolant. Conventionally, the cation exchange resin is a macroporous, strong acid cation exchange resin prepared from styrene and up to about 12 weight percent divinylbenzene, said weight percent being based on the total styrene and divinylbenzene.

In the described ion exchange operation, the capacity of the cation exchange resin to remove the radioactive isotopes from the reactor coolant decreases with time. In a conventional operation, the resin will be employed until the resin can no longer remove the desired amounts of radioactive isotopes from the coolant, at which time, the decontamination factor (DF) (i.e. the ratio of (1) the concentration of radioactive isotopes in the reactor coolant prior to treatment and (2) the concentration of radioactive isotopes following treatment with the ion exchange resin) is reduced to an undesirably low number. Unfortunately, upon reaching an undesirably low DF, the regeneration of the exhausted resin is not practical since the resin cannot effectively be regenerated without creating radioactive waste water. Moreover, due to the presence of radioactive isotopes in the resin, disposal of the resin requires relatively complex and expensive techniques.

Therefore, improvements in the described purification process which extend the operating life of the mixed resin bed are highly desirable. Such improvements are also desirable in other operations involving the removal of radioactive cesium isotopes from an aqueous liquid such as the treatment of water employed in the storage of a nuclear fuel.

Accordingly, in one aspect, the present invention is a method for removing cesium isotopes from an aqueous liquid. The method comprises contacting the cesium containing aqueous liquid with a strong acid cation exchange resin of a highly cross-linked, macroporous copolymer derived from a monovinylidene aromatic and a cross-linking monomer copolymerizable therewith. The cross-linking monomer is employed in an amount of at least 12 mole percent based on the total weight of the monovinylidene aromatic and a cross-linking monomer.

The highly cross-linked, cation exchange resin exhibits an unexpectedly high capacity for removing cesium isotopes from an aqueous liquid. For example, a strong acid resin derived from a copolymer of styrene and 12.5 mole percent divinylbenzene (i.e., 16 weight percent divinylbenzene) exhibits a significantly better performance than a strong acid resin prepared using 9 mole percent (i.e., 12 weight percent) divinylbenzene. Therefore, the method of the present invention is useful in treating the water used in the storage of spent nuclear fuel.

In a particularly preferred embodiment, the present invention is a method for purifying the reactor coolant of a pressurized water or boiling water reactor. Said method, which is particularly advantageously employed in purifying the reactor coolant in the primary circuit of a pressurized water reactor, comprises contacting at least a portion of the reactor coolant with a strong base anion exchange resin and the strong acid cation exchange resin derived from a highly cross-linked, macroporous copolymer of a monovinylidene aromatic and a cross-linking monomer copolymerizable therewith. Although the reactor coolant can sequentially be contacted with one resin type and thereafter with the second resin type, the contact is preferably conducted using a resin bed comprising a mixture of the cation and anion exchange resins.

Surprisingly, by the method of the present invention, the highly cross-linked, strong acid resin can be employed to remove the radioactive isotopes (including cesium, strontium and antimony) from the reactor coolant for unexpectedly long periods without the need to remove and dispose of the resin.

Such an unexpectedly better performance is demonstrated by reference to the FIGURE. Specifically, the FIGURE is a graphically representation plotting the concentration of cesium in a reactor coolant of a pressurized water reactor following treatment with a mixed resin bed containing a cation exchange resin, as a percentage of the concentration of cesium in the reactor coolant prior to treatment, versus the number of bed volumes of the reactor coolant, based on the volume of the cation resin in the mixed resin bed, having been treated by the resin. Curve A represents the exceptional performance of a mixed resin bed containing a macroporous, strong acid resin of a copolymer derived from 80 weight percent styrene and 20 weight percent divinylbenzene. Curve B represents the performance of a mixed bed containing a macroporous, strong acid resin of a copolymer derived from 88 weight percent styrene and 12 weight percent divinylbenzene. Curve C represents the performance of a mixed resin bed containing a gel type strong acid resin of a copolymer derived from 92 weight percent styrene and 8 weight percent divinylbenzene.

Due to this superior performance of the macroporous, strong acid cation exchange resin derived from 20 weight percent of divinylbenzene as the cross-linking monomer, as compared to the macroporous, strong acid cation exchange resin derived from 12 percent divinylbenzene, the period between shut downs for the removal of the resin from the column upon its exhaustion is extended, thereby reducing the costs associated with the disposal of the exhausted resin.

In yet another aspect, the present invention is a resin bed comprising a strong base anion exchange resin and the strong acid cation exchange resin derived from the highly cross-linked, macroporous copolymer of a monovinylidene aromatic and a cross-linking monomer.

The strong acid cation exchange resins useful in the method of the present invention are advantageously macroporous, addition copolymerization productis of a monovinylidene aromatic and a cross-linking monomer; typically, a polyethylenically unsaturated monomer. Monovinylidene aromatics and cross-linking monomers copolymerizable therewith are well-known in the art and reference is made thereto for the purposes of this invention.

The preferred monovinylidene aromatics include styrene, halo-substituted styrenes, e.g., bromostyrene and chlorostyrene, and vinyl naphthalene. Although monoalkyl-substituted styrenes such as vinlyl toluene or ethyl vinylbenzene can also be employed, especially if the substituant groups are not in a para position with respect to each other, said monoalkyl styrenes are more advantageously empolyed in combination with styrene. In the practice of this invention, styrene is the most preferred monovinylidene aromatic.

Preferred cross-linking agents are the polyvinylidene aromatics such as divinylbenzene, divinyl toluene, divinyl xylene, divinyl napthalene, divinyl sulfone, trivinylbenzene, divinyldiphenyl ether, divinyldiphenyl sulfone and isopropenyl vinylbenzene; divinyl sulfide; ethylene glycol dimethacrylate and the like. Of such cross-linking monomers the divinylidene aromatic compounds, particularly divinylbenzene and divinyldiphenyl sulfone, most especially divinylbenzene, are preferably employed herein.

The highly cross-linked, copolymer is derived from at least 12 mole percent of the cross-linking monomer and less than 88 mole percent of the monovinylidene aromatic, said mole percents being based on the total moles of the cross-linking agent and the monovinylidene aromatic. Typically, this corresponds to a copolymer derived from at least 16 weight percent of the cross-linking monomer and less than 84 weight percent of the monovinylidene aromatic, said weight percents being based on the weight of the cross-linking monomer and monovinylidene aromatic. Advantageously, the highly cross-linked copolymer is derived from less than 35 weight percent of the cross-linking monomer. Preferably, the copolymer is composed, in polymerized form, of from 18 to 28, more preferably 18 to 25, weight percent of the cross-linking monomer and from 72 to 82, more preferably from 75 to 82, weight percent of the monomer of the monovinylidene aromatic. Most preferably, the copolymer is composed of 18 to 24 weight percent divinylbenzene and from 76 to 82 weight percent styrene.

The highly cross-linked, macroporous copolymers are prepared using methods employed for copolymerizing a monvinylidene aromatic and cross-linking monomer in macroporous (macrorecticular) form. Such methods (including the catalyst, polymerization medium and pore forming materials) are well-known in the art and reference is made thereto for the purposes of this invention. Representative of such methods are disclosed in U.S. Pat. Nos. 3,173,892; 3,549,562; 3,637,535 and 4,104,209.

Although, the highly cross-linked, macroporous copolymer can be prepared in granular form, advantageously, the copolymer is prepared in the form of spheroidal beads, preferably with a volume average particle diameter of from 0.1 to 1.4 mm, with an average diameter between 0.3 and 1.2 being most preferred.

Strong acid resins are prepared from the highly cross-linked, macroporous copolymers using techniques well-known in the art for converting cross-linked copolymers of a monovinylidene aromatic to a strong acid cation exchange resin. Illustrative of such methods for preparing strong acid resins are U.S. Pat. Nos. 3,266,007; 2,500,149; 2,631,127; 2,664,801; 2,764,564 and *Ion Exchange* by F. Halfferich, published in 1962 by McGraw-Hill Book Company, New York (all of which are hereby incorporated by reference). In general, the strong acid resins are prepared by sulfonating the copolymer. While the sulfonation may be conducted neat, generally, the copolymers are swollen using a suitable swelling agent such as a sulfonation resistant chlorinated hydrocarbon (e.g., chlorobenzene or tetrachloroethylene) or an aliphatic or aromatic hydrocarbon (e.g., toluene or xylene) and the swollen copolymer reacted with a sulfonating agent such as sulfuric or chlorosulfonic acid or sulfur trioxide. Preferably, an excess amount of the sulfonating agent, e.g., from about 2 to about 7 times the weight of the copolymer, is employed and the sulfonation is conducted at a temperature from 50° C. to 200° C.

Although the highly cross-linked, strong acid resin can suitably be employed in any of a variety of cationic forms, e.g., $H^+$, $NH_4^+$, $Na^+$ or the like, to remove cesium or other radioactive isotopes from an aqueous liquid; the $H^+$ form of the resin generally results in the most effective operation. Specifically, the $H^+$ form of the cation resin possesses the most desirable combination of resin capacity (i.e., the total amounts of cesium and/or other radioactive isotopes which can be removed from the solution by the resin) and resin kinetics (i.e., the rate at which the cation exchange resin can abstract cesium or other radioactive isotopes from solution). In general, following sulfonation, substantially all the sulfonated copolymer will have an $H^+$ form. A preferred highly cross-linked, macroporous, strong acid resin is sold as XZ-86275 by The Dow Chemical Company.

Cesium, and optionally, other radioactive cations are removed from an aqueous liquid by contacting the cesium containing aqueous liquid with the highly cross-linked, macroporous, strong acid resin at conditions sufficient to remove the desired amounts of cesium and other radioactive isotopes from the aqueous liquid. As used herein, the term "aqueous liquid" refers to water (including aqueous liquids such as alkaline or acidic aqueous solutions, e.g., an aqueous solution of calcium or sodium hydroxide, or aqueous salt solutions) or a mixture of water and a water-miscible liquid such as a lower alkanol, e.g., methanol, ethanol or propanol; a lower ketone, e.g., acetone or methyl ethyl ketone; an ether, e.g., diethyl ether or diethylene glycol methyl-ether and the like.

Although batch-type techniques can be employed in treating the cesium containing aqueous liquid, in general, continuous type, ion exchange techniques wherein the cesium containing aqueous liquid is continuously flowed, either upwardly or downwardly, preferably downwardly, through a column containing the highly cross-linked, macroporous, strong acid resin are preferred. In general, the contact of the strong acid resin with the cesium containing aqueous liquid, is conducted at ambient temperatures with a flow rate of the cesium containing aqueous liquid being from 1 to 100 volumes of the liquid per each volume of the highly cross-linked, macroporous, strong acid resin (i.e., from 1 to 100 bed volumes (BV) of the cesium containing aqueous liquid) per hour. The specific conditions for such contact are dependent on a variety of factors including the specific aqueous liquid and the concentration of cesium (and other radioactive) isotopes in the aqueous liquid; the specific strong acid resin employed and the amount of cross-linking monomer employed in its preparation; the desired amounts of cesium (and other radioactive) isotopes to be removed from the aqueous liquid and the like. As an example, in the treatment of water employed in the storage of the nuclear fuel of cesium and other radioactive isotopes, the cesium containing liquid is advantageously flowed through a bed of the highly cross-linked, macroporous strong acid resin at a rate generally from 10 to 70, preferably from 15 to 40, BV/hour.

Alternatively, in a process for purifying the reactor coolant of a pressurized water or boiling water reactor, the reactor coolant is advantageously flowed through the highly cross-linked, macroporous, strong acid resin and a strong base, anion exchange resin (herein generally referred to as "strong base resin").

The strong base resin is suitably a strong base resin of the gel or macroporous type, which resins are well-known in the art. Conventionally, the strong base resin is a cross-linked copolymer of a monovinylidene aromatic and a cross-linking monomer copolymerizable therewith which polymer bears quarternary ammonium groups.

In general, these resins are prepared by copolymerizing the monovinylidene aromatic and cross-linking agent, halomethylating the cross-linked addition copolymer and thereafter quarternizing the halomethylated resin using techniques well-known in the art, with reference being made thereto for the purposes of this invention. For example, as illustrated by U.S. Pat. Nos. 2,642,417; 2,960,480; 2,597,492; 2,597,493; 3,311,602 and 2,616,877, halomethylation of the cross-linked copolymer can be conducted by contacting the cross-linked addition copolymer with a halomethylating agent in the presence of a Friedel-Crafts catalyst. Alternatively, the halomethylated cross-linked copolymer can be prepared by copolymerizing a polymerizable, halomethylated monovinylidene aromatic such as vinyl benzylchloride with a cross-linking monomer using techniques such as described in U.S. Pat. No. 2,992,544. Strong base resins are subsequently prepared from the halomethylated copolymer by heating, with reflux, a mixture of the halomethylated copolymer with at least a stoichoimetric amount of a tertiary amine such as trimethyl amine, dimethylisopropanol amine and the like at temperatures sufficient to react the amine with the benzylic halogen atom.

Alternatively, the strong base resin can be the cross-linked addition polymerization product of a suitable nitrogen-containing compound. For example, the addition copolymerization product of vinyl pyridene or vinyl methylpyridene, a cross-linking agent such as divinylbenzene, divinyl ketone or methylene bisacryl-amide and, optionally, a monovinylidene aromatic such as styrene can be converted to a quaternary ammonium form. A strong base resin can also be prepared by the addition polymerization of a diallyldimethylammonium chloride which polymerization may also include a cross-linking agent such as divinyl ketone.

The preferred strong base resins are quaternary ammonium derivatives of a gel-type copolymer of styrene and divinylbenzene. Although various anionic forms of the strong base resin can be employed, the strong base resin is preferably in OH$^-$ form, with a residual chloride anion content of less than about 3, more preferably less than 1, percent based on the total capacity of the resin.

Advantageously, the strong base resins are prepared in the form of spheroidal beads having a number average particle size of 0.1 to 1.4 mm, preferably from 0.3 to 1 mm.

Although, in the purification of the reactor coolant, the coolant can be sequentially contacted with first one type of resin followed by contact with the second type of resin, the coolant is more advantageously contacted with a resin bed comprising a mixture of the highly cross-linked, macroporous, strong acid resin and the strong base resin. In general, the mixed resin bed will comprise from 0.8 to 1.2, preferably from 0.9 to 1.1, equivalents of the strong base resin (i.e., equivalents of anionic exchange sites) for each equivalent of the highly cross-linked, macroporous, strong acid resin contained in the mixed resin bed. This typically corresponds with a resin bed comprising from 30 to 50 volume percent of the strong base resin and from 50 to 70 volume percent of the strong acid resin, said volume percents being based on the total volume of the resin employed in preparing the mixed resin bed. Most preferably, the mixed resin bed comprises equal amounts, on an equivalent basis, of the strong base resin and the highly cross-linked, macroporous, strong acid resin.

The contact of the reactor coolant with the mixed resin bed is advantageously conducted by continuously flowing the coolant through the mixed resin bed at a rate from 10 to 90, preferably from 30 to 80, more preferably from 40 to 60, BV per hour, said rate being based on the volume of the highly cross-linked, macroporous, cation exchange resin in the mixed resin bed.

Following ion exchange resin treatment, the purified reactor coolant can be recirculated directly to the reactor. Alternatively, the reactor coolant may subsequently be treated with an additional bed comprising a strong acid cation exchange resin. Such additional, cation exchange resin bed is particularly advantageously employed in operations where the reactor coolant may contain excess lithium or cesium isotopes or to prevent leakage of radioactive cations back to the reactor.

The following example is included to demonstrate the advantages of the present invention and should not be construed to limit its scope. All percentages are weight percentages unless otherwise indicated.

EXAMPLE

A column capable of containing ion exchange resins is connected to the primary circuit of a pressurized water reactor such that a portion of the reactor coolant exiting from the heat exchanger-boiler will flow downwardly through any ion exchange resin contained by said column. A mixed resin bed comprising 40 volume parts of a strong base resin and 60 volume parts of a highly cross-linked, macroporous, strong acid resin is added to the column. The strong acid resin is the sulfonated derivative, in H+ form, of a highly cross-linked, macroporous copolymer derived from 80 percent styrene and 20 percent divinylbenzene. The reactor coolant is flowed downwardly through this mixed resin bed at a rate of 50 BVs based on the volume of strong acid resin, per hour. The concentration of the radioactive isotopes in the reactor coolant as it enters the column and as it exits from the column, following ion exchange treatment, are measured using conventional gamma spectrometry techniques. Curve A in the Figure represents the exceptional performance obtained using the mixed resin bed comprising the highly cross-linked, macroporous strong acid resin to purify the reactor coolant. Specifically, the number of bed volumes, based on the volume of the strong acid resin, of reactor coolant passing through the mixed resin bed prior to any leakage of the cesium (i.e., prior to the coolant exiting from the column containing the mixed resin bed is found to contain a measurable amount of cesium isotopes) is measured to be 38,000. Of greater importance, 95,000 bed volumes, based on the volume of the strong acid resin, of the reactor coolant pass through the mixed resin bed prior to reaching a cesium decontamination factor of 2 wherein the cesium decontamination factor is defined as the ratio of cesium in the reactor coolant entering the ion exchange column to the amount of cesium in the reactor coolant exiting from the column.

Alternatively, as indicated by Curve B in the Figure, using the same techniques except employing a mixed resin bed comprising an identical strong base resin but a macroporous, strong acid resin derived from 88 percent styrene and only 12 percent divinylbenzene, only 47,000 bed volumes of the reactor coolant, based on the volumes of strong acid resin, pass through the mixed resin bed prior to obtaining a decontamination factor of 2. Alternatively, only 30,000 bed volumes of the reactor coolant pass through an identical mixed resin bed except comprising, as the strong base resin, a gel, strong acid resin derived from 92 percent styrene and 8 percent divinylbenzene prior to reaching a decontamination factor of 2. (See, Curve C of the FIGURE). Moreover, initial leakage of cesium occurs much sooner using these mixed resin beds to purify the reactor coolant than when the mixed resin bed comprising the highly cross-linked, macroporous, cation exchange resin is employed for said purification.

As evidenced by these results, the results of the purification of the reactor coolant using mixed resin bed of the present invention which comprises a highly cross-linked, macroporous, strong acid resin is surprisingly superior to the results obtained in the purification of the reactor coolant using a mixed resin bed comprising a more lightly cross-linked, strong base resin, of the gel or macroporous type.

We claim:

1. A method for removing cesium isotopes from an aqueous liquid, the method comprising contacting the cesium containing aqueous liquid with a strong acid, cation exchange resin of a highly cross-linked, macroporous copolymer derived from styrene and divinylbenzene, wherein the styrene is employed in an amount ranging from 76 to 82 weight percent and the divinylbenzene is employed in an amount ranging from 18 to 24 weight percent based on the weight of the styrene and divinylbenzene.

2. A method for purifying cesium containing rector coolant of a pressurized water or boiling water reactor, said method comprising contacting the cesium containing reactor coolant with a strong base anion exchange resin and a strong acid cation exchange resin of a highly crosslinked, macroporous copolymer derived from styrene and divinylbenzene, wherein the styrene is employed in an amount ranging from 76 to 82 weight percent and the divinylbenzene is employed in an amount ranging from 18 to 24 weight percent based on the weight of the styrene and divinylbenzene.

3. The method of claim 2 wherein the reactor coolant is the reactor coolant employed in the primary circuit of a pressurized water reactor.

4. The method of claim 3 wherein the contact of the reactor coolant with the ion exchange resins is conducted by passing the reactor coolant through a resin bed containing a mixture of the strong base anion exchange resin and the highly cross-linked, macroporous, strong acid cation exchange resin.

5. The method of claim 4 wherein the mixed resin bed comprises from 30 to 50 volume percent of the strong acid resin and from 50 to 70 volume percent of the strong base resin, said volume percents being based on the total volume of the strong base and strong acid resins.

6. The method of claim 4 wherein the strong base anion exchange resin is the quaternized derivative of a gel type copolymer derived from a monovinylidene aromatic and a cross-linking monomer.

7. The method of claim 4 wherein the strong base anion exchange resin is a quaternary ammonium, gel-type, copolymer derived from a polymerizable nitrogen containing compound.

* * * * *